United States Patent [19]

Guttinger et al.

[11] Patent Number: 5,226,524
[45] Date of Patent: Jul. 13, 1993

[54] HESITATING BUCKET CONVEYOR

[75] Inventors: Peter Guttinger, Hilton; Collin R. Cole, Toronto, both of Canada

[73] Assignee: H. J. Langen & Sons Inc., Mississauga, Canada

[21] Appl. No.: 728,581

[22] Filed: Jul. 11, 1991

[51] Int. Cl.$^5$ ............................................. B65G 15/00
[52] U.S. Cl. ............................. 198/343.2; 198/345.3; 198/803.01
[58] Field of Search ............... 198/343.1, 343.2, 345.3, 198/465.1, 465.2, 803.01

[56] References Cited

U.S. PATENT DOCUMENTS

| | | | |
|---|---|---|---|
| 3,125,204 | 3/1964 | Loven | 198/465.2 |
| 3,204,756 | 9/1965 | Lesch | 198/465.1 |
| 3,370,549 | 2/1968 | Livingston | 198/465.1 |
| 3,645,375 | 2/1972 | Gelzer | 198/345.3 |
| 4,653,972 | 3/1987 | Lewis | 198/343.2 |
| 5,060,367 | 10/1991 | Vande Voorde | 198/343.2 |

Primary Examiner—Joseph E. Valenza

[57] ABSTRACT

A bucket conveyor system having at least one station, has a plurality of buckets connected in series to form a train of buckets. At least one of the buckets has a cam member depending from it. A cam follower carried by a bucket drive can engage the cam member of the bucket to drive the bucket train along a conveyor course. At the station the cam follower disengages in such a manner that it slows the bucket train to a stationary position in a progressive manner. Thereafter, the cam follower re-engages the cam and accelerates the bucket from the stationary position. The path of the bucket drive at the station, between the point of disengagement of the cam follower from the cam member, and the point of re-engagement determines the delay of a bucket or bucket train at the station. By adjustment of the path length at the station it is possible to adjust the period of delay of a bucket or a bucket train at the station.

36 Claims, 11 Drawing Sheets

HESITATING BUCKET CONVEYOR

FIELD OF INVENTION

This invention relates to a bucket conveyor system, in particular a bucket conveyor system in which one or more buckets moving along a bucket support, stop in the vicinity of a station for a pre-determined period of time and thereafter move away from the station along the bucket support.

BACKGROUND OF THE INVENTION

It is known to have a conveyor system with moving buckets supported by, and capable of being stopped at, a pre-determined position for a pre-determined period of time in the vicinity of a station. While a bucket is stationary it is possible, for example, for load items to be loaded or unloaded from the bucket. In such a system, the buckets are driven by a continuous means which engages the buckets through a simple clutch mechanism. When it is desired to stop a bucket, an abutment device is brought into contact with the bucket which temporarily prevents movement of the bucket along the conveyor support. The clutch mechanism between the bucket and the continuous means slips as the abutment device overrides the continuous means.

This known type of bucket conveyor system has disadvantages. There is considerable wear on the clutch mechanism when the bucket is stopped because the clutch mechanism is not disengaged but rather just slips. The friction wear on the clutch mechanism necessitates frequent replacement of parts. Also, in this known bucket conveyor system, the bucket is brought to an abrupt stop when the abutment device is brought into contact with the bucket. This will cause loose items carried by the bucket to be thrown about within the bucket. The speed at which the conveyor system can operate will thus be limited so as not to result in the disarrangement of items in the bucket during the abrupt deceleration. Also, when the abutment device is removed from contact with the bucket, the continuous means will no longer be overridden and the bucket will accelerate to the speed of the continuous means. However, the characteristics of the acceleration of the bucket will depend largely on the clutch mechanism and the acceleration will be abrupt.

Also, in a bucket conveyor system a plurality of buckets which are moving on the conveyor support are spaced a desired distance apart (the "pitch"). As explained above, in the known systems, once the abutment device is removed from contact with a bucket, the bucket will accelerate to the speed of the continuous means. However the characteristics of the acceleration of a bucket will depend partly on the particular clutch mechanism associated with that bucket. In a conveyor system having a plurality of buckets, the characteristics of each of the clutch systems will not be identical, and therefore the characteristics of the acceleration of each bucket will not be identical. Therefore, even if every bucket is stopped for the same pre-determined period of time, there will be an inconsistent spacing of buckets once the buckets are moving again along the conveyor support.

The present invention overcomes the disadvantages of the known conveyor systems by providing for an engaging element driven and supported by a continuous carrying means. The engaging element engages the bucket and drives the bucket along a bucket support. When it is desired to stop the bucket, the engaging element is disengaged from the bucket. Furthermore the invention may provide a path for the engaging element so that the engaging element decelerates the bucket in a progressive manner, and further, at the point of disengagement of the engaging element, the bucket is stationary on the bucket support.

The engaging element then moves along a path and remains disengaged from the bucket for the desired predetermined period of time, after which the bucket is re-engaged. Once the engaging element has re-engaged the bucket, the bucket will accelerate and commence moving again along the bucket support. Furthermore the invention may provide a path for the engaging element, such that upon re-engagement, the acceleration of the bucket is smooth and not abrupt.

STATEMENT OF THE INVENTION

According to one aspect of the invention there is provided in a bucket conveyor system a plurality of buckets connected in series to form a bucket train, at least one but not all of said plurality of buckets having element engageable means, a continuous means carrying an engaging element adapted to freely engage an engageable means of the bucket and to move the bucket train, the continuous carrying means carrying the engaging element from a first state of engagement with the element engageable means of said bucket to a second state of non-engagement with the element engageable means of said bucket and thereafter to a further state of engagement again with the element engageable means of said bucket, the bucket train coming to and remaining stationary for a period of time while the engaging element is in a state of non-engagement with the element engageable means.

According to another aspect of the invention there is provided in a bucket conveyor system having at least one station, and comprising a plurality of buckets connected in series to form a bucket train, at least on but not all of said plurality of buckets having element engageable means, a continuous means carrying an engaging element, adapted to freely engage an element engageable means of a bucket, to move the bucket train, the continuous carrying means carrying the engaging element from a first position of engagement with the element engageable means of the said bucket to a second position of disengagement from the element engageable means of said bucket and thereafter to a third position of re-engagement with the element engageable means of said bucket and finally to a fourth position of engagement with the element engageable means of said bucket, the bucket train remaining in a stationary position for a period of time while the engaging element is disengaged from the element engageable means of said bucket.

According to another aspect of the invention there is provided in a bucket conveyor system having at least one station, a bucket having an element engageable means associated therewith, a continuous means carrying an engaging element adapted to freely engage the engageable means and move the bucket, the continuous carrying means carrying the engaging element along a path from a first state of engagement with the element engageable means to a second state of non-engagement with the element engageable means and thereafter to a further state of engagement again with the element engageable means, the bucket coming to and remaining stationary for a period of time while the engaging element is in a state of non-engagement with the element engageable means, said continuous carrying means being adaptable to vary the length of the path along which the engaging element is carried between the second state of non-engagement and the further state of engagement whereby the duration of time the bucket remains stationary at the station may be altered.

BRIEF DESCRIPTION OF THE DRAWINGS

The invention will be more clearly understood after reference to the following detailed specification read in conjunction with the drawings describing and illustrating example embodiments of the invention.

Figure 1:
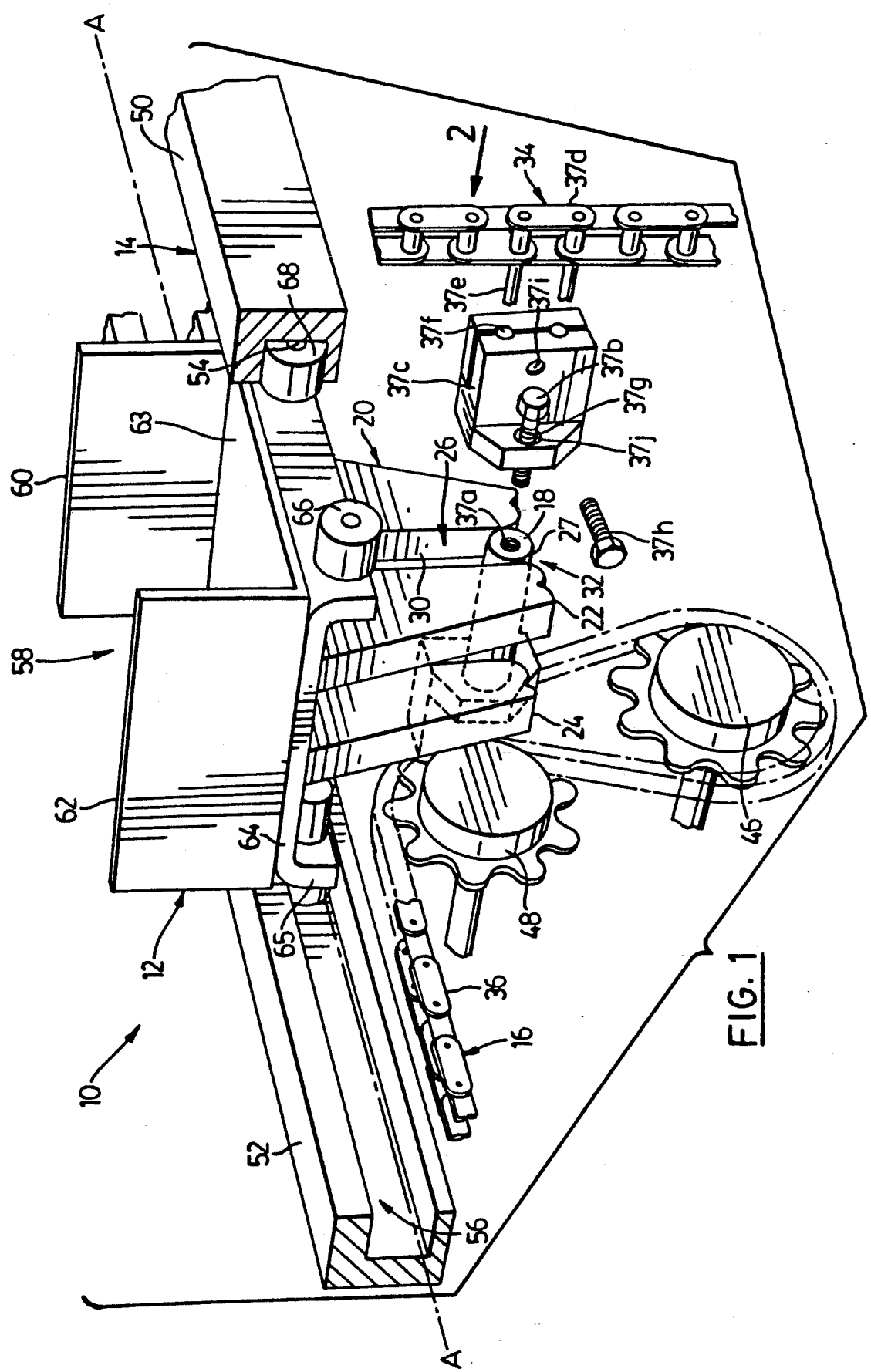
FIG. 1 is a perspective view, partially broken away of a portion of a bucket conveyor system according to one embodiment of the invention.
Figure 2:
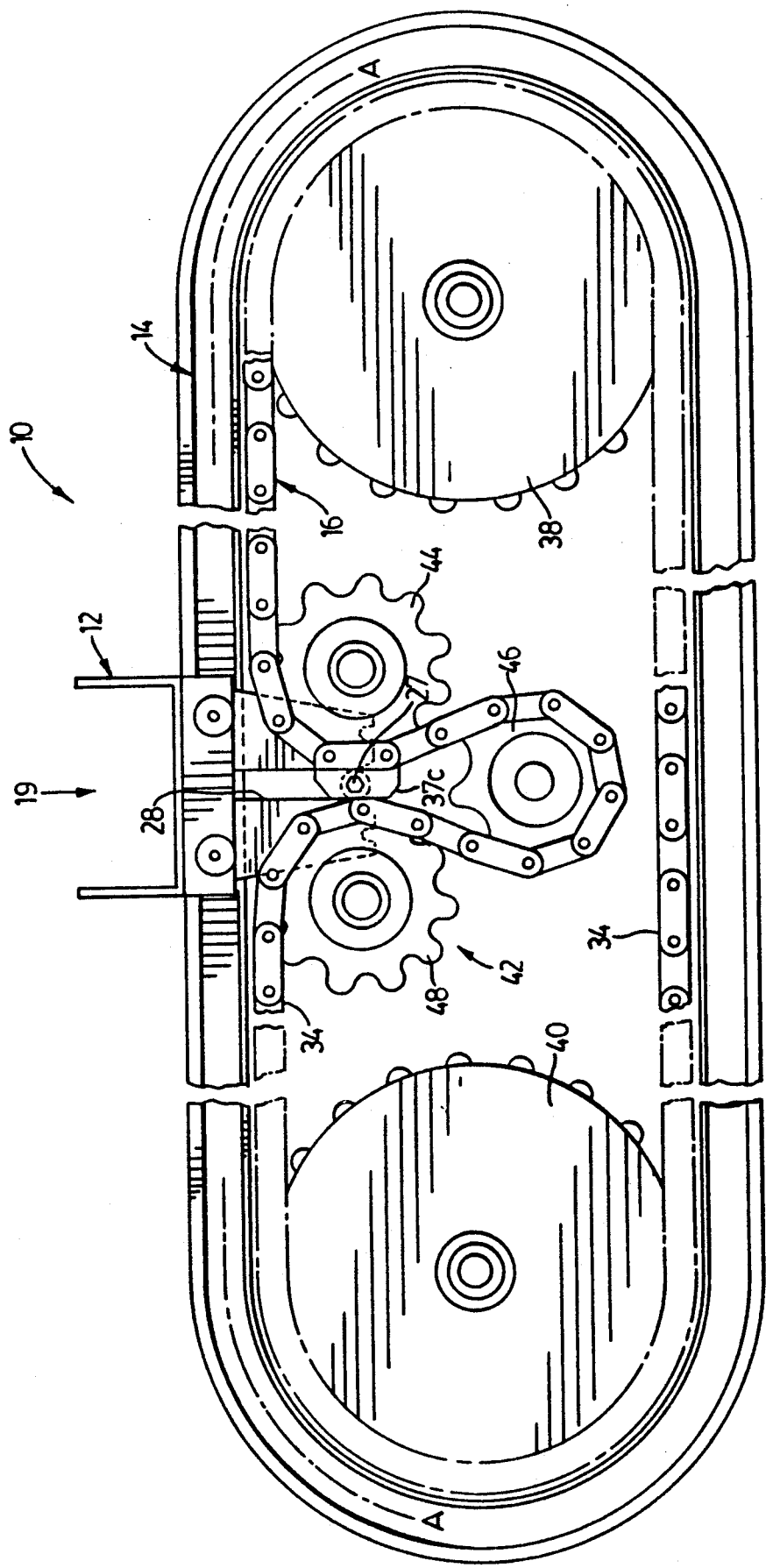
FIG. 2 is a side view, partially in section, of the bucket conveyor system of FIG. 1.
Figure 3:
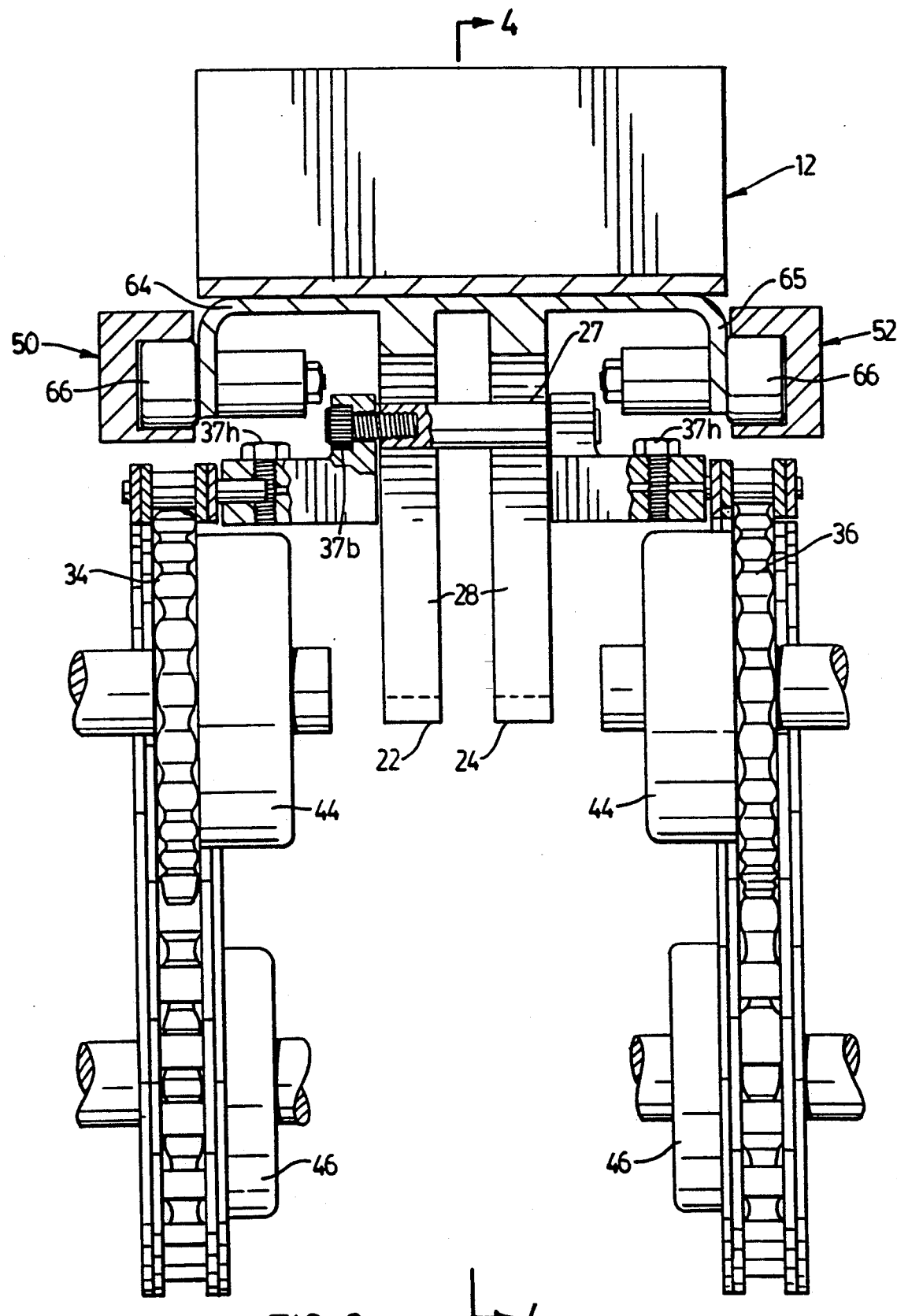
FIG. 3 is a cross-sectional view, taken along line 3—3 in FIG. 4.

The example embodiment shown in FIGS. 1 to 3 of the drawings, comprises a bucket conveyor system 10 including a bucket 12, a bucket support 14, a continuous means 16 carrying an engaging element 18, and a station generally identified at 19 (See FIG. 2).

Bucket 12 has a depending element engageable means 20 comprising a cam member 21 having a pair of spaced cams 22,24 with identical slots 26 which are together capable of receiving engaging element 18, which is a cam follower 27. Slots 26 each have two parallel sides 28,30 and an opening 32, and cam follower 27 abuts sides 28,30. Continuous carrying means 16 comprises a pair of conventional link chains 34,36 supporting the ends of cam follower 27. Cam follower 27 has a threaded centre bore 37a adapted to receive bolts 37b at each end of the cam follower. Chain mounting blocks 37c are secured to supporting chain links 37d of chains 34,36 by a pair of link pins 37e which are received in bosses 37f of mounting blocks 37c and secured therein by clamping bolts 37h which are received in openings 37i. Threaded bolts 37b are received through openings 37j in mounting blocks 37c and engaged by threaded bores 37a at either end of cam follower 27. Chains 34,36 are both driven by conventional drive means such as sprocket wheels 38,40 as shown in FIG. 2.

At station 19, there is a guide means 42 comprising an arrangement of two sets of sprockets each set engaging one of the two chains 34,36. As shown in FIGS. 1 to 3, chain 36 follows a path at station 19 defined by the arrangement of three freely rotating journalled sprockets 44, 46 and 48. Likewise, chain 34 follows a path at station 19 also defined by a corresponding arrangement of three sprockets. As chains 34,36 both move at the same speed, cam follower 27 will be carried between chains 34,36 on a path corresponding to that of the chains.

Bucket support 14 consists of a track 49 comprising a pair of planar, spaced, parallel rails 50,52 and has a longitudinal axis A. Rails 50 and 52 are channelled members having longitudinal channels 54,56 orientated inwardly to face axis A. Bucket 12 has an item holding compartment 58 defined by a pair of opposite walls 60,62 and a bottom 63 carried by a base 64 having downwardly turned side flanges 65. Flanges 65 have journalled wheels 66,68 projecting laterally threrefrom which are received in channels 54,56. By this construction, bucket 12 is supported by and movable on rails 50,52.

In the operation of this device, FIGS. 4 to 10 illustrate the movement of bucket 12 in the area of station 19, showing the sequential movement of cam follower as it is carried on a path defined by the movement of supporting links 37d of chains 34,36.

Figure 4:
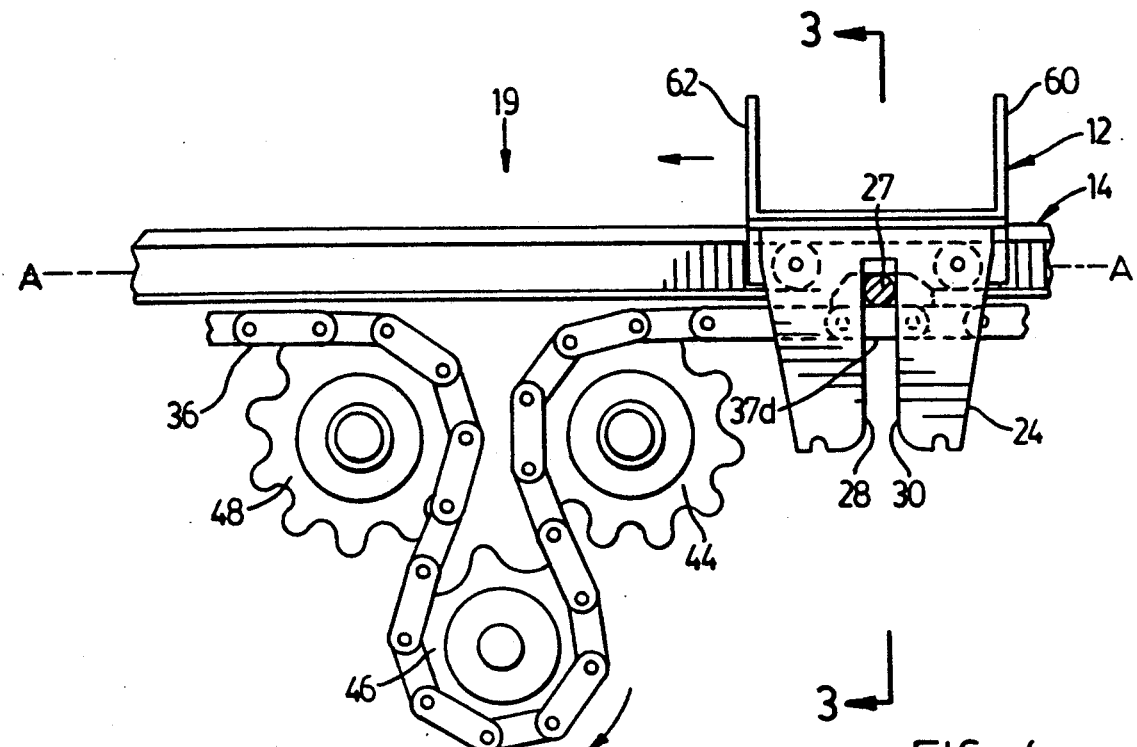
FIG. 4 is a cross-sectional side view, taken along line 4—4 of FIG. 3, of a portion of the system of FIG. 1 showing a bucket approaching a station.
Figure 5:
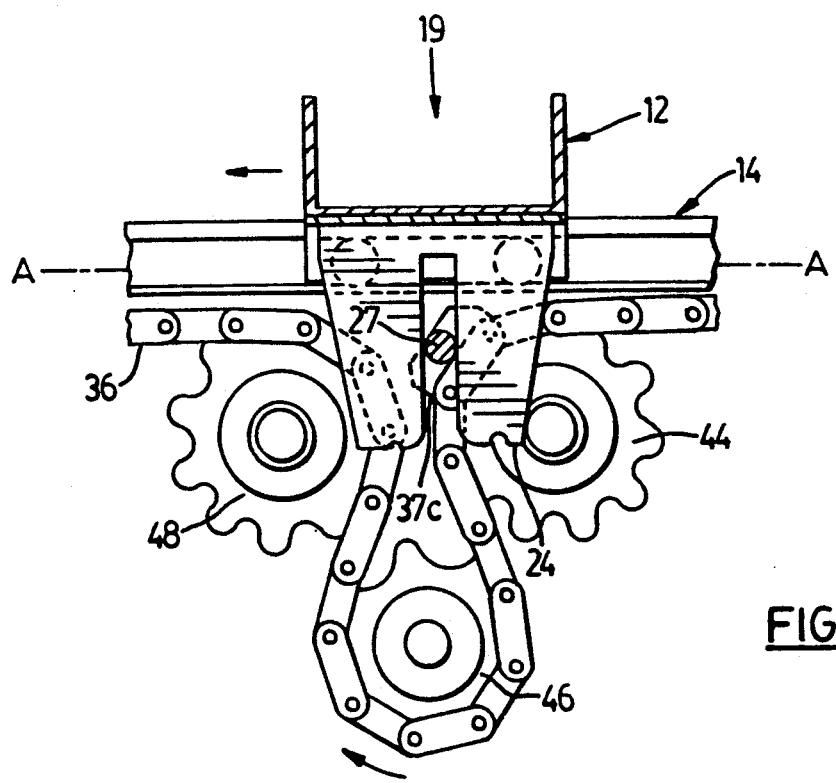
FIG. 5 is a view similar to FIG. 4 showing a bucket decelerating at a station.

FIG. 4 shows bucket 12 approaching station 19. In a this position of engagement, cam follower is received freely in slots 26 of cams 22,24 and abuts slot sides 28,30. The forward movement of chains 34,36 carries cam follower 27 in a direction parallel to axis A. Cam follower 27 is in engagement with cams 22,24 and drives bucket 12 along rails 50,52. It will be appreciated that in the position of bucket 12 shown in FIG. 4, the speed of the bucket will be equal to the speed of chains 34,36.

As bucket 12 reaches station 19, the supporting links 37d of chains 34,36 pass over an arc of the circumference of sprockets 44. At the position shown in FIG. 5, engaging element 18 is moving from a position of engagement with cams 22,24 to a position of disengagement from cams 22,24 and cam follower 27 is being carried by chains 34,36 in a circular path about sprockets 44. Although cam follower 27 has a velocity with a magnitude equal to the speed of chains 34,36, the direction of the cam follower is tangential to the circumference of sprockets 44. Thus, cam follower 27 has a velocity component in the direction of axis A that is reduced in magnitude from the speed of chains 34,36. At this position, the velocity of cam follower 27 also has a directional component towards the openings 32 in slots 26 which is normal to axis A. Consequently the velocity of the bucket along rails 50,52 is reduced.

Figure 6:
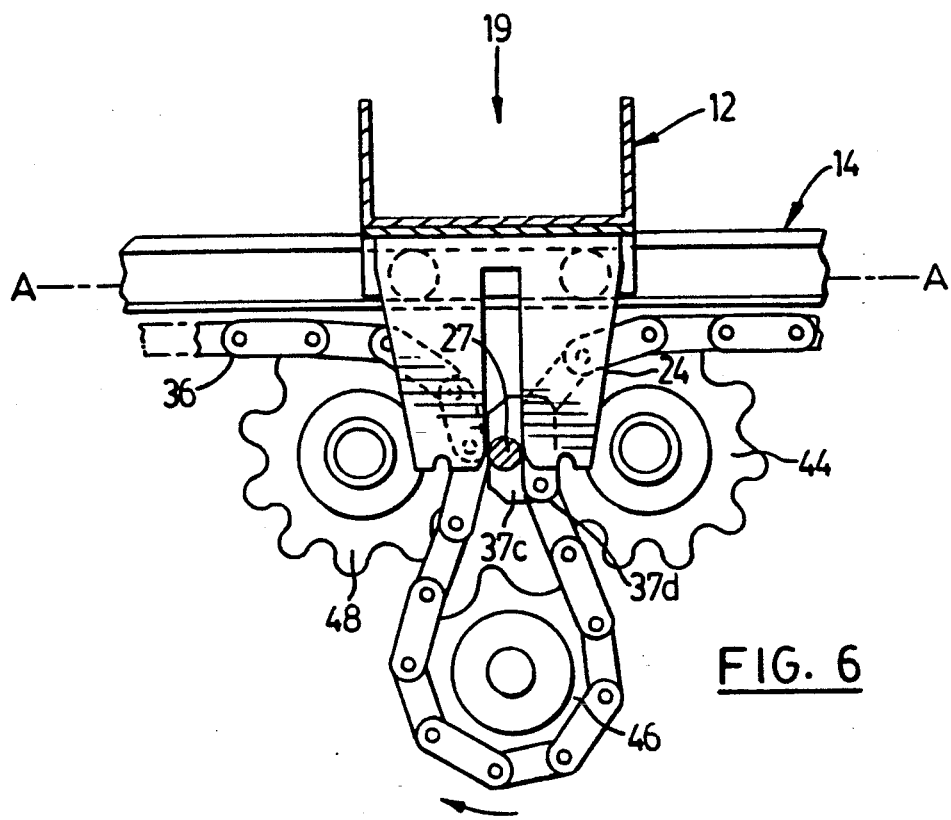
FIG. 6 to 8 are views similar to FIG. 4 each showing a bucket stationary at a station.

In FIG. 6, cam follower 27 is still moving in a circular path defined by the movement of supporting links 37d of chains 34,36 over sprockets 44. The velocity of cam follower 27 is still tangential to sprockets 44, but at this position the velocity has no component in the direction of axis A and the velocity has a direction entirely normal to axis A. Consequently, at this position of cam follower 27, bucket 12 is stationary on rails 50,52. It will be appreciated that as cam follower 27 rotates on a path corresponding to the movement of chains 34,36 as supporting links 37d pass over sprockets 44, the magnitude of the velocity component in the direction of axis A will progressively decrease from the speed of chains 34,36 to zero at the position depicted in FIG. 6. Thus, the deceleration of bucket 12 to the stationary position will be smooth.

At the position as shown in FIG. 6, cam follower 27 is positioned at the openings 32 of slots 26 and thus has reached a position of disengagement from cams 22,24.

Figure 7:
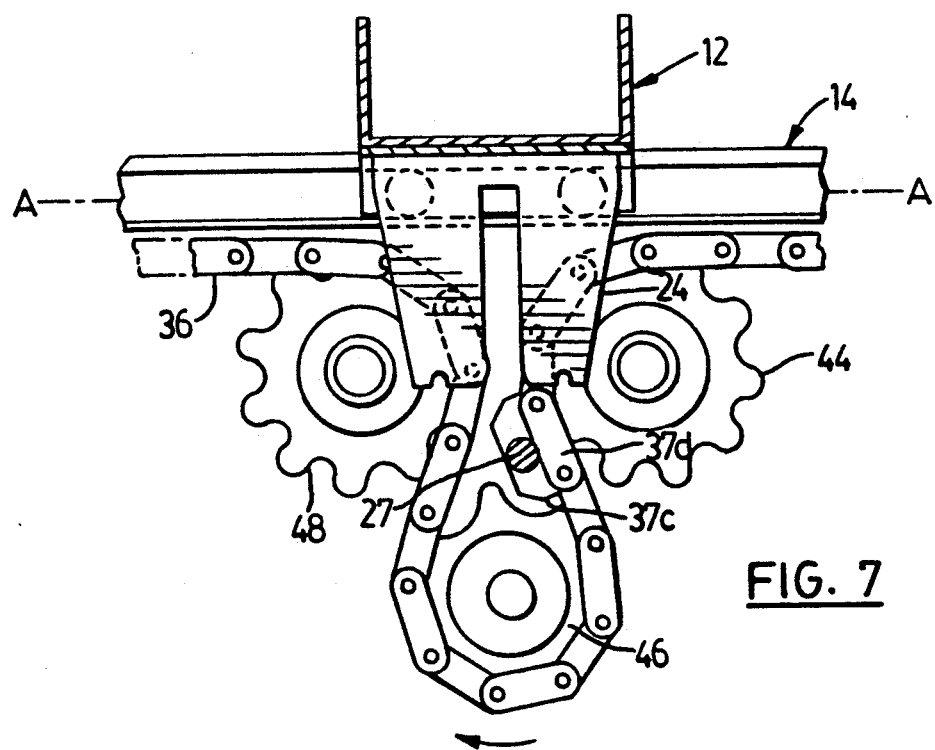

As supporting links 37d of chains 34,36 move past the position shown in FIG. 6, cam follower 27 is in a position of non-engagement with cams 22,24 as the supporting links follow a path defined by the position of second sprockets 46. Thus, movement of cam follower 27 will not move bucket 12 along bucket support 14. As shown in FIG. 7, cam follower 27 is completely disengaged from cams 22,24.

The supporting links 37d of chains 34,36 next pass over an arc of the circumference of second sprockets 46 carrying cam follower 27 in a corresponding circular path. During the period of time that cam follower 27 is disengaged from cams 22,24 bucket 12 remains stationary on rails 50,52. This permits bucket 12 to be loaded or unloaded.

Figure 8:
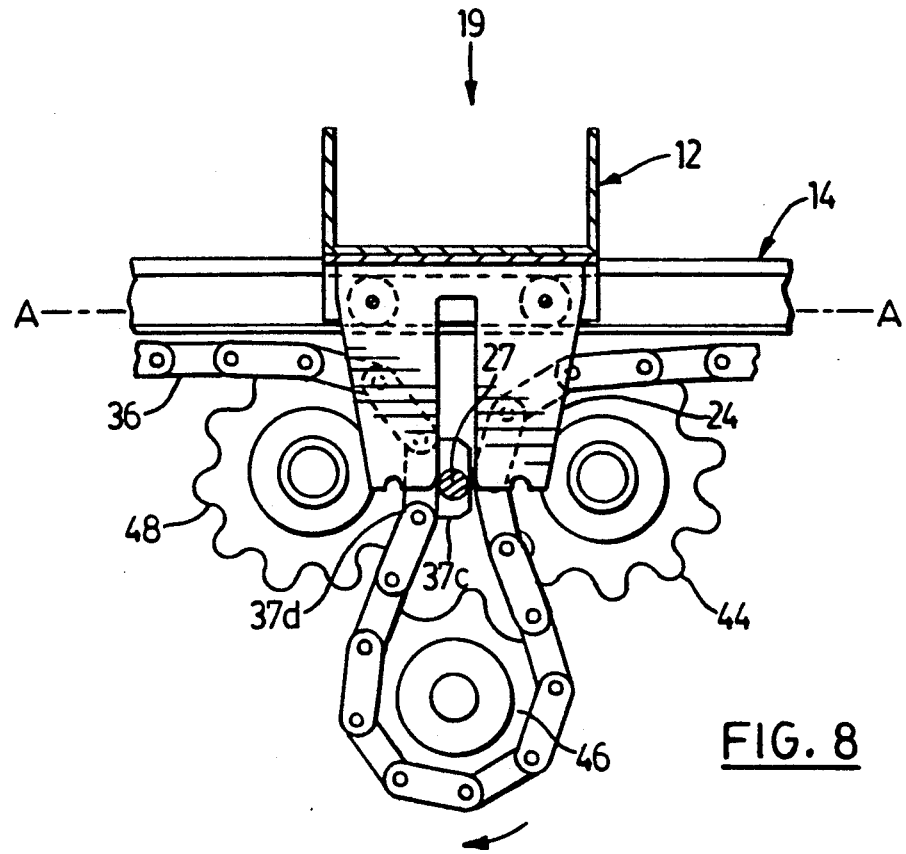

After following an arc about second sprockets 46, supporting links 37d of chains 34,36 thereafter follow a path defined by the position of sprockets 48. As shown in FIG. 8, cam follower 27 has reached openings 32 of slots 26 as supporting links 37d of chains 34,36 reach sprockets 48. The velocity of cam follower 27 at this point has a direction normal to axis A. At this position of cam follower 27, bucket 12 has not commenced moving on rails 50,52 however cam follower 27 is in a position of re-engagement with slots 26 of cams 22,24 and movement of bucket 12 is about to commence.

As supporting links 37d of chains 34, 36 pass over an arc of sprockets 48, cam follower 27 moves in a corresponding circular path as it is carried by the supporting links and the velocity of engaging element 18 has a direction tangential to the circumference of final sprockets 48. As supporting links 37d of chains 34,36 pass over an arc of the circumference of final sprockets 48, the velocity component of cam follower 27 in the direction of axis A will progressively increase from zero. Once cam follower 27 re-engages with slots 26 of cams 22,24 and abuts sides 28,30 of the slots, bucket 12 will have a smooth increase in velocity from the stationary position along rails 50,52.

Figure 9:
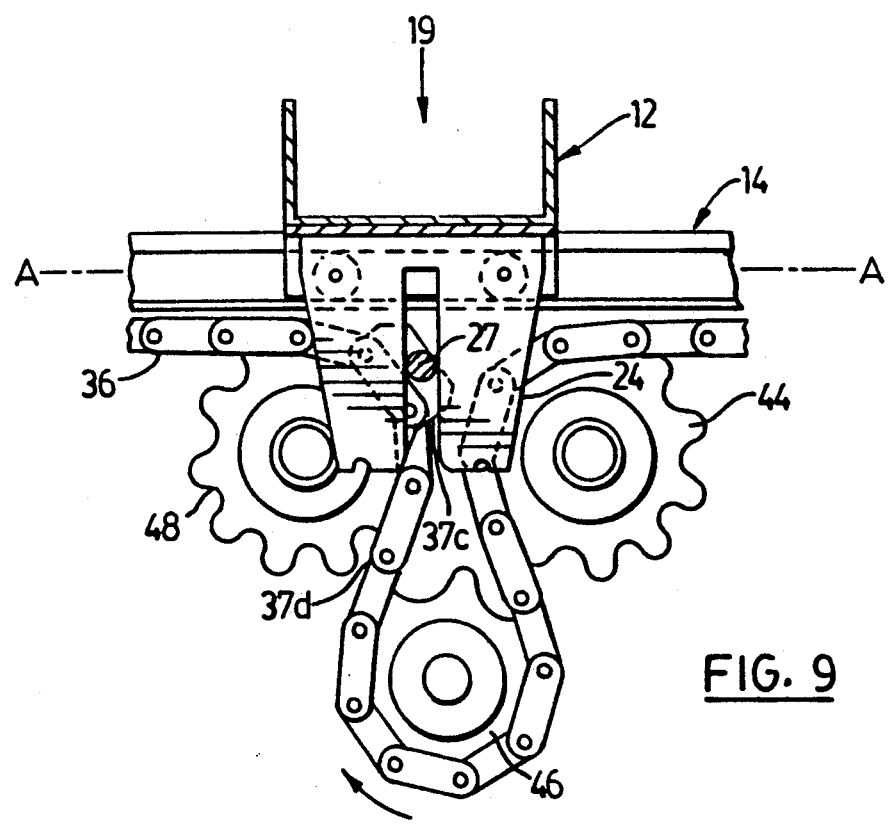
FIG. 9 is a view similar to FIG. 4 showing a bucket stationary accelerating at a station.

As shown in FIG. 9, cam follower 27 is re-engaging with slots 26 of cams 22,24 and at this position cam follower 27 has a velocity with a component in the direction of axis A. Consequently, bucket 12 is moving along rails 50,52. It will be readily appreciated that at the position of cam follower 27 shown in FIG. 9, the velocity component in the direction of axis A is becoming progressively larger. Thus, bucket 12 is accelerating along rails 50,52 at the position shown in FIG. 9.

Figure 10:
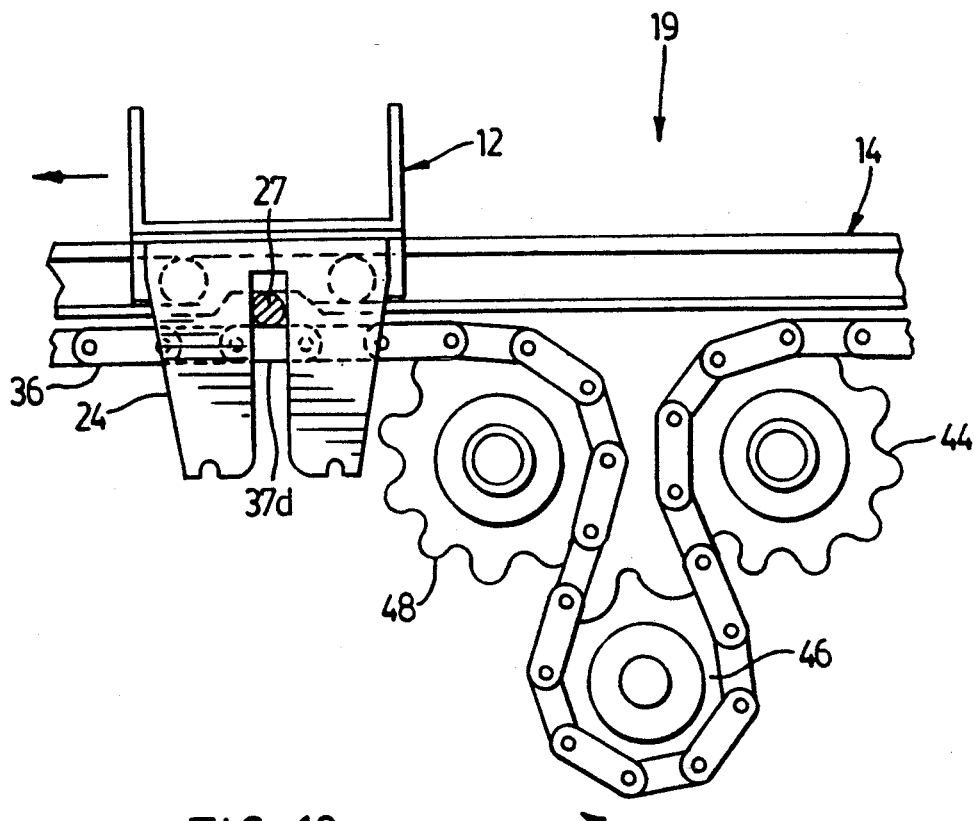
FIG. 10 is a side view similar to FIG. 4 showing a bucket leaving a station.

At the position shown in FIG. 10, supporting links 37d of chains 34,36 have passed over an arc of sprockets 48 and cam follower 27 is engaged again with slots 26 of cams 22,24 and once again cam follower 27 is moving in a direction parallel to axis A. Cam follower 27 abuts sides 28,30 of slots 26 and drives bucket 12 along rails 50,52 at the same speed as that of chains 34,36.

It will be appreciated that at the position of disengagement of cam follower 27 from cams 22,24 described above, depending on the direction of movement of the cam follower, bucket 12 could still be moving along rails 50,52. If bucket 12 were still moving at the point of disengagement, cam follower 27 would have to re-engage cams 22,24 of the bucket further along rails 50,52.

It will also be appreciated that the dwell time (i.e. the period of time during which the bucket remains stationary) can be varied by altering the path length that cam follower 27 moves along, between the second position of disengagement and the third position of re-engagement, while maintaining a constant speed of both chains 32,34 and cam follower.

Figure 11:
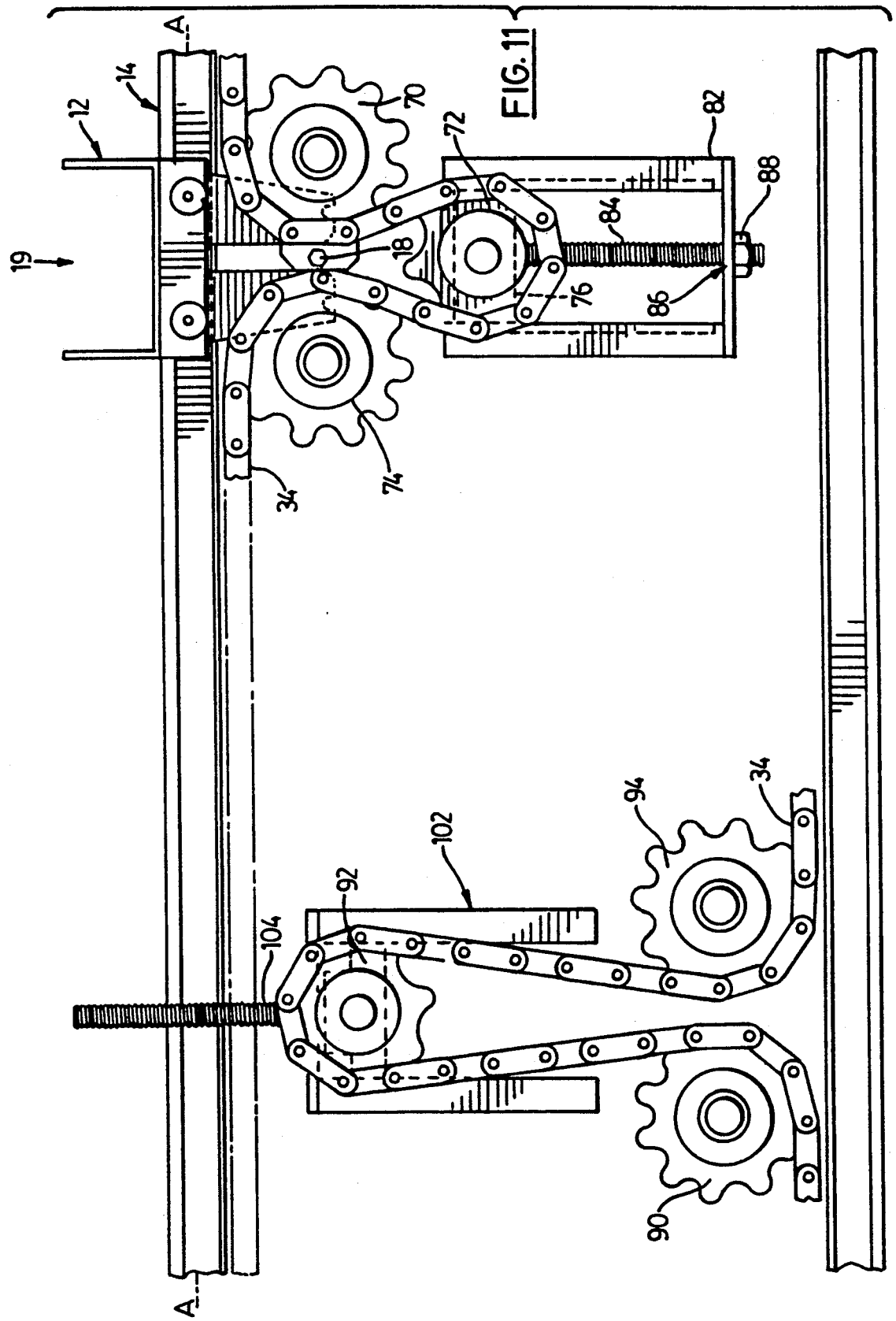
FIGS. 11 and 12 are side views, partially in section, of a further embodiment of a bucket conveyor system made in accordance with the invention.
Figure 12:
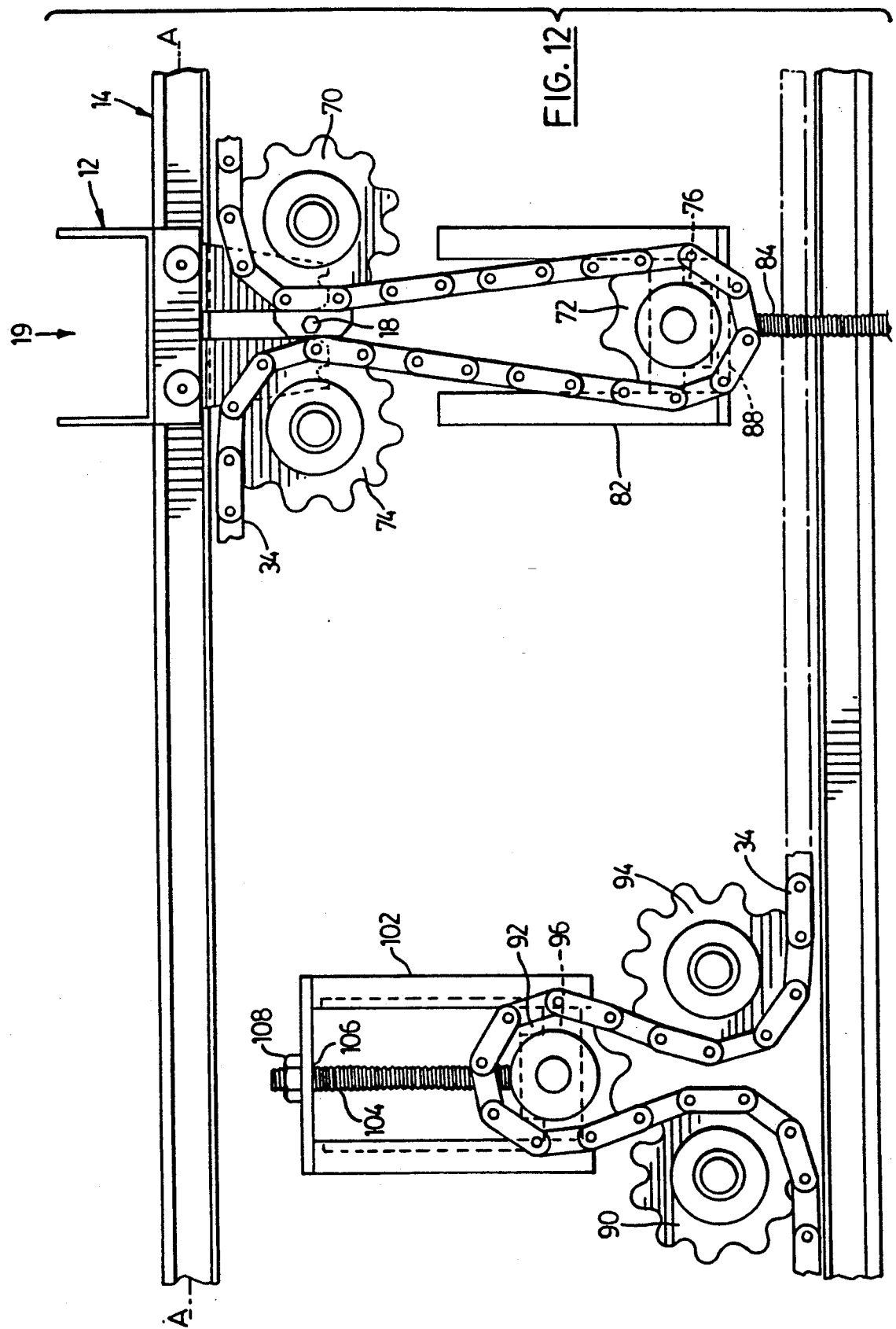
Figure 13:
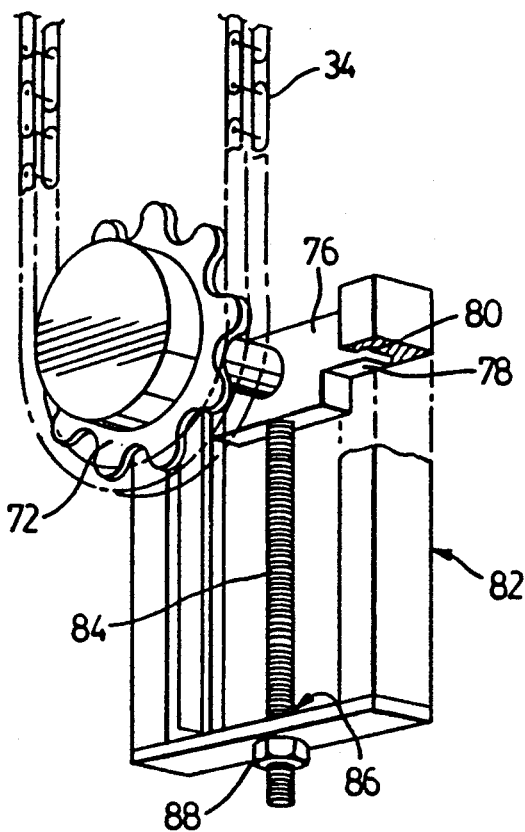
FIG. 13 is a perspective view of an adjustable mounting arrangement of one of the sprockets shown in FIGS. 11 and 12.

In accordance with a second embodiment of the invention FIGS. 11 and 12 illustrate a bucket conveyor system similar to the previous embodiment which comprises a bucket 12 having element engageable means 20 is supported by and movable along a pair of parallel rails 50,52. A pair of parallel continuous chains 34,36 has supporting links 37d supporting an engaging element 18, all as described above. On the forward run, supporting links 37d of chains 34,36 each pass over a set of three freely rotatable journalled sprockets 70, 72 and 74. Sprockets 70,74 are mounted in a similar manner as sprockets 44,46 described above and shown in FIGS. 1-10. As shown in FIGS. 11,12 and 13 sprockets 72 each are freely mounted to a mounting block 76. Each mounting block 76 has side flanges 78 receivable in channels 80 of a frame 82. Each mounting block 76 is secured to one end of a threaded bolt 84. Bolt 84 is received through an opening 86 in frame 82, and receives nut 88 to abut frame 82 at opening 86. Supporting links 37d of chains 34,36 each pass over arcs of the circumferences of the sets of sprockets 70,72,74 as shown in FIG. 11.

Associated with the returns of each of chains 34,36 are two other sets of freely rotatable journalled sprockets each comprising sprockets 90,92,94. Sprockets 90,94 correspond with sprockets 70,74. Sprockets 92 are mounted in the same manner as sprockets 72, each mounted to a mounting block 96. Mounting blocks 96 also have ends 98 receivable in two channels 100 of frame 102. Mounting blocks 96 are secured to one end of threaded bolt 104. Similarly, bolts 104 are received through an opening 106 in frames 102, and receive nuts 108 to abut frames at openings 106.

In operation, this conveyor system will act in the same manner as that shown in FIGS. 1-10, and as described above. Engaging element 18 will move from a position of engagement with element engageable means 20 to a position of disengagement from the element engageable means, to a position of re-engagement with the element engageable means and finally to a position of engagement again with the element engageable means. However because of the use of the sets of sprockets 70,72,74 and 90,92,94 for chains 34,36, and in particular the mounting arrangement for second sprockets 72,92, it will be appreciated that an adjustment to the position of sprockets 72 can be made, if a corresponding adjustment in the opposite direction is made to sprocket 92.

As described above, once engaging element 18 is disengaged from and in a position of non-engagement with element engageable means 20, bucket 12 will remain stationary until the engaging element re-engages the element engageable means. The period of time that elapses between disengagement and re-engagement of the engaging element depends upon the speed of chains 34,36 and the length of the paths of supporting links 37d as they pass from the circumference of sprockets 70, over an arc of sprockets 72 to the circumference of sprockets 74, during which time engaging element 18 remains non-engaged with element engageable means 20. It will be readily appreciated that by adjusting threaded bolts 84, sprockets 72 can be moved from the position shown in FIG. 11 to that shown in FIG. 12.

Thus, the path length of supporting links 37d is increased, and for a constant speed of chains 34,36 engaging element 18 will remain disengaged from element engageable means 20 for a longer period of time, and consequently the bucket will remain stationary in the vicinity of the station for a longer period of time. It will be noted, that because chains 34,36 are continuous, to make the adjustment in position of sprockets 72, it is necessary to make a corresponding opposite adjustment in the position of sprockets 92. To move sprockets 72 from the position shown in FIG. 11 to that shown in FIG. 12, it is necessary to also make an adjustment to sprockets 92. The period of time the bucket remains stationary in the vicinity of the station can thus be varied by adjustment of second sprockets 72 and 92.

Figure 14:
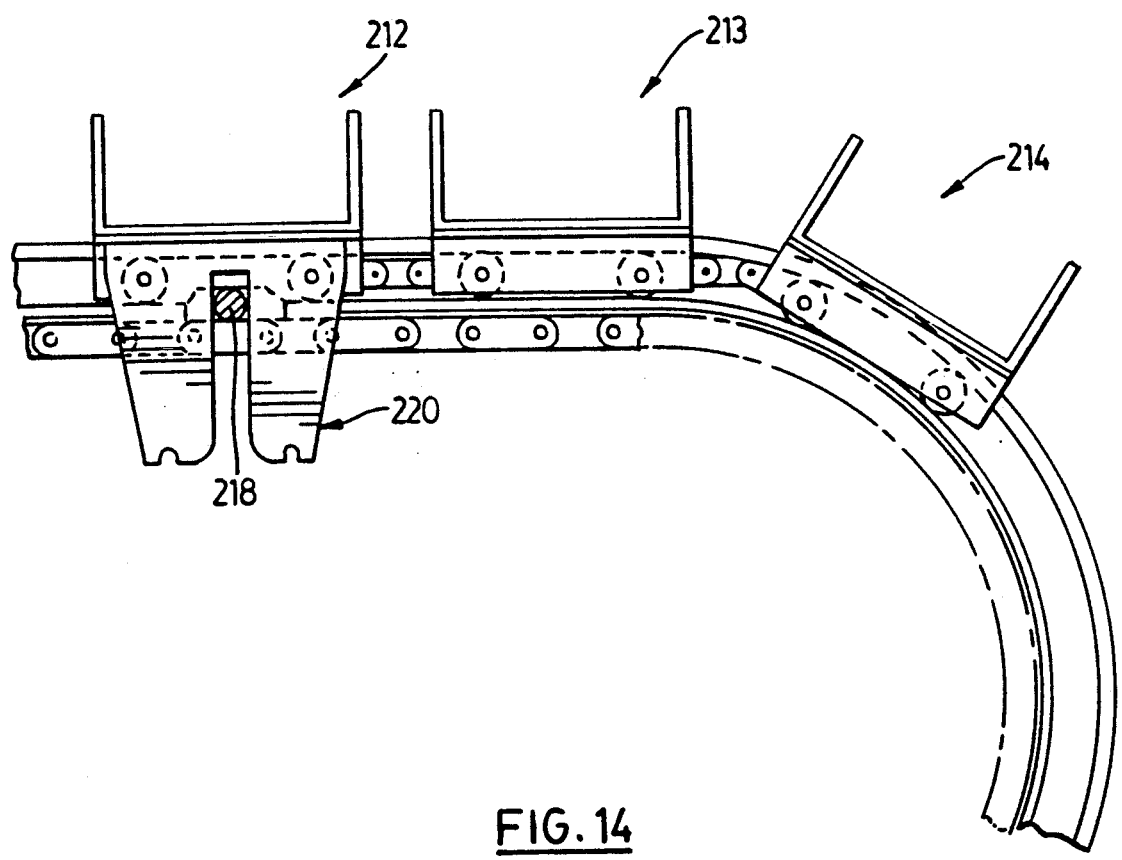
FIG. 14 is a side view of a plurality of buckets in series that could be utilized in a bucket conveyor system made in accordance with this invention.

In FIG. 14, a series of buckets 212, 213 and 215 is shown, each bucket interconnected to form a train and each bucket supported by and movable along rails 50,52. Only bucket 212 has depending engageable means 220, for being engaged by an engaging element 218. Thus when engaging element 218 is non-engaged with engageable means 220 of bucket 12 at a station constructed as described above, the series of buckets 212, 213 and 214 all remain stationary for a period of time, permitting unloading or loading of each of the buckets in the series.

Various other modifications to the invention can be made. For example, the length of the path of the engaging element 18 between the first position of engagement with element engageable means 20, and the second position of disengagement of the engaging element could be altered by changing the diameter of first sprocket 44. This would have the effect of varying the rate of deceleration of bucket 12. Likewise, the diameter of final sprocket 48 could be changed thus varying the rate of acceleration of bucket 12 from the stationary position.

We claim:

1. In a bucket conveyor system;
   a. a plurality of buckets connected in series to form a bucket train, at least one but not all of said plurality of buckets having element engageable means;
   b. a continuous means carrying an engaging element adapted to freely engage the engageable means of a bucket and to drive the bucket train, the continuous carrying means, in operation, carrying the engaging element from a first state of engagement with the element engageable means of said bucket to a second state of non-engagement with the element engageable means of said bucket and thereafter carrying an engaging element to a further state of engagement with the element engageable means of said bucket, the bucket train coming to and remaining stationary for a period of time while the engaging element is in a state of non-engagement with the element engageable means.

2. In a bucket conveyor system having at least one station:
   (a) a plurality of buckets connected in series to form a bucket train, at least one but not all of said plurality of buckets having element engageable means;
   (b) a continuous means carrying an engaging element, adapted to freely engage an element engageable means of a bucket, to drive the bucket train, the continuous carrying means carrying the engaging element from a first position of engagement with the element engageable means of said bucket to a second position of disengagement from the element engageable means of said bucket and thereafter to a third position of re-engagement with the element engageable means of said bucket and finally to a fourth position of engagement with the element engageable means of said bucket, the bucket train remaining in a stationary position for a period of time while the engaging element is disengaged from the element engageable means of said bucket.

3. A bucket conveyor system as claimed in claim 2 wherein, in operation, the continuous means in carrying the engaging element from the first position of engagement to a second position of re-engagement decelerates, the bucket train to a stationary position.

4. A bucket conveyor system as claimed in claim 3 wherein the deceleration of the bucket train to the stationary position is progressive.

5. A bucket conveyor system as claimed in claim 2 wherein, in operation, the continuous means in carrying the engaging element from the third position of re-engagement to the fourth position of engagement, accelerates the bucket train from a stationary position.

6. A bucket conveyor system as claimed in claim 5 wherein the acceleration of the bucket train from the stationary position is progressive.

7. A bucket conveyor system as claimed in claim 2 wherein in carrying the engaging element from the first position of engagement to a second position of disengagement, the bucket train is decelerated to a stationary position and in carrying the engaging element from the third position of re-engagement to the fourth position of engagement, the bucket train is accelerated from a stationary position.

8. In a bucket conveyor system having at least one station:
   a) bucket support means;
   b) a plurality of buckets connected in series to form a bucket from each bucket supported by, and movable along, the bucket support means, at least one but not all of the buckets of said bucket train having an element engageable means associated therewith; and
   c) continuous means carrying at least one engaging element and means to drive the continuous carrying means;
   d) guide means for the continuous carrying means, in operation, carrying an engaging element along a path, at the station, from a first position of engagement with the element engageable means of said bucket wherein the bucket train moves along the bucket support means, to a second position of disengagement from the element engageable means of said bucket, to a third position of re-engagement with the element engageable means of said bucket and thereafter to a fourth position of engagement with the element engageable means of said bucket wherein the bucket train moves again along the bucket support means, whereby the bucket train decelerates to a stationary position when the engaging element reaches the second position of disengagement and accelerates from the stationary position after the engaging element has reached the third position of re-engagement.

9. A bucket conveyor system as claimed in claim 8, wherein the guide means is mounted for movement to provide for an adjustable path length for said engaging element between the second position of disengagement and the third position of re-engagement.

10. A bucket conveyor system as claimed in claim 8 wherein the bucket support means has a longitudinal axis, and the engaging element moves in a path from the first position of engagement to the second position of disengagement such that at the second position of disengagement the engaging element is moving in a direction normal to the longitudinal axis, whereby the bucket train has decelerated to a stationary position.

11. A bucket conveyor system as claimed in claim 10 wherein the path of the engaging element from the first position of engagement to the second position of disengagement is arcuate, whereby the deceleration of the bucket train to the stationary position is progressive.

12. A bucket conveyor system as claimed in claim 8 wherein the bucket support means has a longitudinal axis, and the engaging element moves in a path from the third position of re-engagement to the fourth position of engagement such that at the third position of re-engagement the engaging element is moving in a direction normal to the longitudinal axis.

13. A bucket conveyor system as claimed in claim 10 wherein the path of the engaging element from the third position of re-engagement to the fourth position of engagement is arcuate, whereby the acceleration of the bucket train from the stationary position is progressive.

14. A bucket conveyor system as claimed in claim 8 wherein the bucket support means has a longitudinal axis, and the engaging element moves in an arcuate path both, from the first position of engagement to the second position of disengagement, and also from the third position of re-engagement to the fourth position of engagement, and at both the second position of disengagement and the third position of re-engagement the engaging element is moving in a direction normal to the longitudinal axis, whereby the bucket train has a progressive deceleration to, and a progressive acceleration from, a stationary position, and the bucket train reaches a stationary position when the engaging element reaches the second position of disengagement.

15. A bucket conveyor system having at least one station, comprising:
a) a track having a longitudinal axis;
b) a plurality of buckets connected in series to form a bucket train, each bucket supported by, and movable along, the track;
c) a cam member depending from at least one but not all of each of the buckets and having a slot therein;
d) continuous means carrying a cam follower receivable in the slot;
e) means to drive the continuous carrying means; and
f) guide means arranged to provide a path at the station for the continuous carrying means, in operation, to move the cam follower from a first position of engagement with the cam member wherein the bucket train moves on the track, to a second position of disengagement from the cam member, to a third position of re-engagement with the cam member, and thereafter to a fourth position of engagement with the cam member wherein the bucket train again moves on the track, whereby the bucket train rests at a stationary position on the track when the cam follower has disengaged from the cam member and accelerates from the stationary position after or at the same time as the cam follower reaches the third position of re-engagement.

16. A bucket conveyor system as claimed in claim 15 wherein the path of the continuous carrying means at the station moves the cam follower to provide for a progressive deceleration of the bucket train along the track to the stationary position.

17. A bucket conveyor system as claimed in claim 15 wherein the path of the continuous carrying means at the station moves the cam follower to provide a progressive acceleration of the bucket train along the track from the stationary position.

18. A bucket conveyor system as claimed in claim 15 wherein the guide means is adjustable to vary the length of path of the continuous carrying means when moving the cam follower between the second and third positions.

19. A bucket conveyor system as claimed in claim 15 wherein the track comprises a pair of parallel rails, each of the buckets having wheels movable along the rails.

20. A bucket conveyor system as claimed in claim 19 wherein the continuous carrying means comprises a pair of parallel continuous chains each of the chains having links supporting an end of the cam follower, and the guide means comprises two sets of a plurality of freely rotatable sprockets, each set of sprockets engaging one of the chains to provide said path.

21. A bucket conveyor system as claimed in claim 20 wherein each of the sets of sprockets is arranged to provide a path for the continuous carrying means to move the cam follower, when the cam follower is at the second position of disengagement, in a direction normal to the longitudinal axis of the rails.

22. A bucket conveyor system as claimed in claim 21 wherein the path of the continuous carrying means provides for a progressive deceleration of the bucket train to a stationary position.

23. A bucket conveyor system as claimed in claim 20 each of the sets of sprockets is arranged to provide a path for the continuous carrying means to move the cam follower, when the cam follower is at the third position of re-engagement, in a direction normal to the longitudinal axis of the rails.

24. A bucket conveyor system as claimed in claim 23 wherein the path of the continuous carrying means provides for a progressive acceleration of the bucket train from the stationary position.

25. A bucket conveyor system as claimed in claim 15 wherein the slot of the cam member is longitudinal and has an opening and two parallel side walls, the side walls being normal to the longitudinal axis of the track.

26. A bucket conveyor system as claimed in claim 25 wherein the side walls are spaced apart so as to receive the cam follower freely in abutment with both side walls.

27. A bucket conveyor system as claimed in claim 1 wherein only the leading bucket has an element engageable means.

28. A bucket conveyor system as claimed in claim 1 wherein the engaging element engages an element engageable means of the leading bucket.

29. A bucket conveyor system as claimed in claim 2 wherein only the leading bucket has an element engageable means.

30. A bucket conveyor system as claimed in claim 2 wherein the engaging element engages an element engageable means of the leading bucket.

31. A bucket conveyor system as claimed in claim 8 wherein only the leading bucket has an element engageable means.

32. A bucket conveyor system as claimed in claim 8 wherein the engaging element engages an element engageable means of the leading bucket.

33. A bucket system as claimed in claim 15 wherein only the leading bucket has a cam member depending therefrom.

34. A bucket conveyor system as claimed in claim 15 wherein the cam follower engages a cam member depending from the leading bucket.

35. A bucket conveyor system as claimed in claim 3 wherein the deceleration of the bucket train to the stationary position is sinusoidal in character.

36. A bucket conveyor system as claimed in claim 5 wherein the accelerator of the bucket train from a stationary position is sinusoidal in character.

* * * * *